United States Patent
Zhang et al.

(10) Patent No.: US 10,354,244 B2
(45) Date of Patent: Jul. 16, 2019

(54) METHOD, APPARATUS AND SYSTEM FOR PROCESSING PAYMENT REQUEST FOR VIRTUAL COMMODITIES ON OPEN NETWORK PLATFORM

(71) Applicant: TENCENT TECHNOLOGY (SHENZHEN) COMPANY LIMITED, Shenzhen, Guangdong (CN)

(72) Inventors: Ding Zhang, Shenzhen (CN); Ningguo Chen, Shenzhen (CN); Jianwei Deng, Shenzhen (CN); Mingming Zhao, Shenzhen (CN); Hailiang Fan, Shenzhen (CN); Yulan Liao, Shenzhen (CN); Ruting Chen, Shenzhen (CN); Qiang Fei, Shenzhen (CN); Songjian Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 767 days.

(21) Appl. No.: 14/807,324

(22) Filed: Jul. 23, 2015

(65) Prior Publication Data

US 2015/0332244 A1    Nov. 19, 2015

Related U.S. Application Data

(63) Continuation of application No. PCT/CN2013/089860, filed on Dec. 18, 2013.

(30) Foreign Application Priority Data

Jan. 31, 2013 (CN) .......................... 2013 1 0038926

(51) Int. Cl.
*G06Q 40/00* (2012.01)
*G06Q 20/22* (2012.01)
(Continued)

(52) U.S. Cl.
CPC ............. *G06Q 20/22* (2013.01); *G06Q 20/02* (2013.01); *G06Q 20/027* (2013.01); *G06Q 20/123* (2013.01)

(58) Field of Classification Search
USPC .......................................................... 705/39
See application file for complete search history.

(56) References Cited

U.S. PATENT DOCUMENTS

| 7,908,216 B1 * | 3/2011 | Davis ..................... G06Q 20/02 |
| | | 705/41 |
| 2003/0004867 A1 * | 1/2003 | Kight ..................... G06Q 20/02 |
| | | 705/39 |

FOREIGN PATENT DOCUMENTS

| CN | 101000675 A | 7/2007 |
| CN | 101231722 A | 7/2008 |

(Continued)

OTHER PUBLICATIONS

Online Payment Interactive processing method and online payment processing system Xia, Dongming; Fan, Jingjian (Inventors). Tencent Technology (Shenzhen) Company Limited (Assignee). WO 2014012447 A1 (Year: 2014).*

(Continued)

*Primary Examiner* — Bruce I Ebersman
*Assistant Examiner* — John A Anderson
(74) *Attorney, Agent, or Firm* — Anova Law Group, PLLC

(57) ABSTRACT

A method, apparatus and system for processing a payment request for a virtual commodity on an open network platform are provided. The method includes: receiving a payment request that is sent by a third-party application server according to a request from a terminal, the payment request carrying at least an account identifier; deducting a charge from an account corresponding to the account identifier according to a payment attribute corresponding to the (Continued)

account identifier; and sending a charge deduction result corresponding to the account to the terminal via the third-party application server. According to the present method, usage rate of network and system resources is improved.

20 Claims, 4 Drawing Sheets

(51) Int. Cl.
G06Q 20/02 (2012.01)
G06Q 20/12 (2012.01)

(56) References Cited

FOREIGN PATENT DOCUMENTS

| | | |
|---|---|---|
| CN | 101655950 A | 2/2010 |
| CN | 102509219 A | 6/2012 |
| CN | 102831520 A | 12/2012 |
| JP | 2008-152434 A | 7/2008 |

OTHER PUBLICATIONS

The determinants of monetary value of virtual goods (Year: 2013).*
Communication dated Oct. 20, 2016, issued by the State Intellectual Property Office of the P.R.C. in corresponding Chinese Application No. 20130038926.5.
International Search Report of PCT/CN2013/089860, dated Mar. 27, 2014. [PCT/ISA/210].

* cited by examiner

METHOD, APPARATUS AND SYSTEM FOR PROCESSING PAYMENT REQUEST FOR VIRTUAL COMMODITIES ON OPEN NETWORK PLATFORM

This application claims priority to Chinese Patent Application No. 201310038926.5, filed before Chinese Patent Office on Jan. 31, 2013 and entitled "METHOD, APPARATUS AND SYSTEM FOR PROCESSING PAYMENT REQUEST FOR VIRTUAL COMMODITIES ON OPEN NETWORK PLATFORM", which is incorporated herein by reference in its entirety.

TECHNICAL FIELD

The present disclosure relates to the field of Internet technologies, and in particular, to a method, apparatus and system for processing a payment request for virtual commodities on an open network platform.

BACKGROUND

With the rapid development of network technologies, the Internet is gradually becoming an indispensable part of more and more people's lives. With the continuous development of the Internet, a large number of various open network platforms (hereafter also referred to as open platforms or open network platforms) come out on the Internet, such as a Social Networking Services (SNS) website. A variety of network applications are provided to a user on an open network platform. The user may use a corresponding network service, such as online game, online book, or online video, by using the network applications.

A network application may involve some chargeable items, such as chargeable props, books charged by chapter, or videos charged by episode. In the prior art, payment for a network application-related product is made in the following procedure: a third-party application server sends a payment request to an open platform server upon receiving a purchase request sent by a terminal; the open platform server returns a uniform/universal resource locator (URL) to the application server upon receiving the payment request; the third-party application server instructs the terminal to invoke a corresponding application programming interface (API) to display a payment page; the user, after confirming corresponding information, clicks the OK button to instruct the open platform server to deduct a charge, i.e., deduct virtual currency from the corresponding account; and the open platform server, upon successfully deducting the charge, instructs the delivery server to perform a delivery process.

During the implementation of the present disclosure, the inventors find that the prior art has at least the following problems:

During a conventional payment process with respect to a network application-related product, a payment page needs to be popped up on the terminal; afterwards, the user cannot operate on an undergoing application interface, or even cannot see the application interface. The user needs to confirm information on the payment page, and return to the undergoing application interface by clicking the OK button. For example, the user purchases a book-reading application by chapter, and imposes a higher requirement on continuity in book reading. In this case, during purchase of a next chapter, the user generally desires to directly make a payment and quickly and sequentially read the content in the next chapter. If a payment page is popped up forcibly, continuity of the user's reading is interrupted and hence payment willing is reduced. Still for example, during item purchase during multi-role gaming, forcible pop-up of a payment page causes interruption and disturb to users playing such games. With respect to such applications, if a payment page is popped up during use of the applications, normal operations of the users in the applications are affected, tending to cause misoperations. In case of misoperations, the users may need to perform correct operations again to achieve their originally desired objectives. However, such repeated operations cause repeated occupation of network and system resources, thereby resulting in a waste of network and system resources.

SUMMARY

To address the above technical problems, embodiments of the present disclosure provide a method, apparatus and system for processing a payment request for a virtual commodity on an open network platform, to improve usage rate of network and system resources. The technical solutions are as follows:

In a first aspect, an embodiment of the present disclosure provides a method for processing a payment request for a virtual commodity on an open network platform. The method includes:
  receiving a payment request that is sent by a third-party application server according to a request from a terminal, the payment request carrying at least an account identifier;
  deducting a charge from an account corresponding to the account identifier according to a payment attribute corresponding to the account identifier; and
  sending a charge deduction result corresponding to the account to the terminal via the third-party application server.

In a second aspect, an embodiment of the present disclosure provides an apparatus for processing a payment request for a virtual commodity on an open network platform. The apparatus includes:
  a receiving module, configured to receive a payment request that is sent by a third-party application server according to a request from a terminal, the payment request carrying at least an account identifier;
  a charge deducting module, configured to deduct a charge from an account corresponding to the account identifier according to a payment attribute corresponding to the account identifier; and
  a notifying module, configured to send a charge deduction result corresponding to the account to the terminal via the third-party application server.

In a third aspect, an embodiment of the present disclosure provides a system for processing a payment request for a virtual commodity on an open network platform. The system includes: an open platform server, a third-party application server, and at least one terminal.

The third-party application server is configured to: send a payment request to the open platform server according to a request of the terminal, the payment request carrying at least an account identifier; and upon receiving a charge deduction result sent by the open platform server, send the deduction result to the terminal.

The open platform server is configured to: upon receiving the payment request, deduct a charge from an account corresponding to the account identifier according to a payment attribute corresponding to the account identifier; and send a deduction result corresponding to the account to the third-party application server.

The technical solutions provided in the embodiments of the present disclosure achieve the following beneficial effects:

According to the embodiments of the present disclosure, a corresponding account is determined according to an account identifier carried in a payment request, a charge is deducted from the account according to a payment attribute of the account, and a charge deduction result is sent to a terminal via a third-party application server. With respect to different payment attributes of different terminals, different charge deduction methods may be employed, thereby preventing a traditional charge deduction method where payment and charge deduction are implemented only on a pop-up payment page. In this way, misoperations caused due to the pop-up page may be prevented, and usage rate of network and system resources may be improved.

BRIEF DESCRIPTION OF THE DRAWINGS

For a better understanding of the technical solutions in the embodiments of the present disclosure, the accompanying drawings for illustrating the embodiments are briefly described below. Apparently, the accompanying drawings in the following description illustrate only some embodiments of the present disclosure, and persons of ordinary skill in the art may derive other accompanying drawings based on these accompanying drawings without any creative efforts.

DETAILED DESCRIPTION

To make the objectives, technical solutions, and advantages of the present disclosure clearer, embodiments of the present disclosure are described in detail below with reference to the accompanying drawings.

Figure 1:
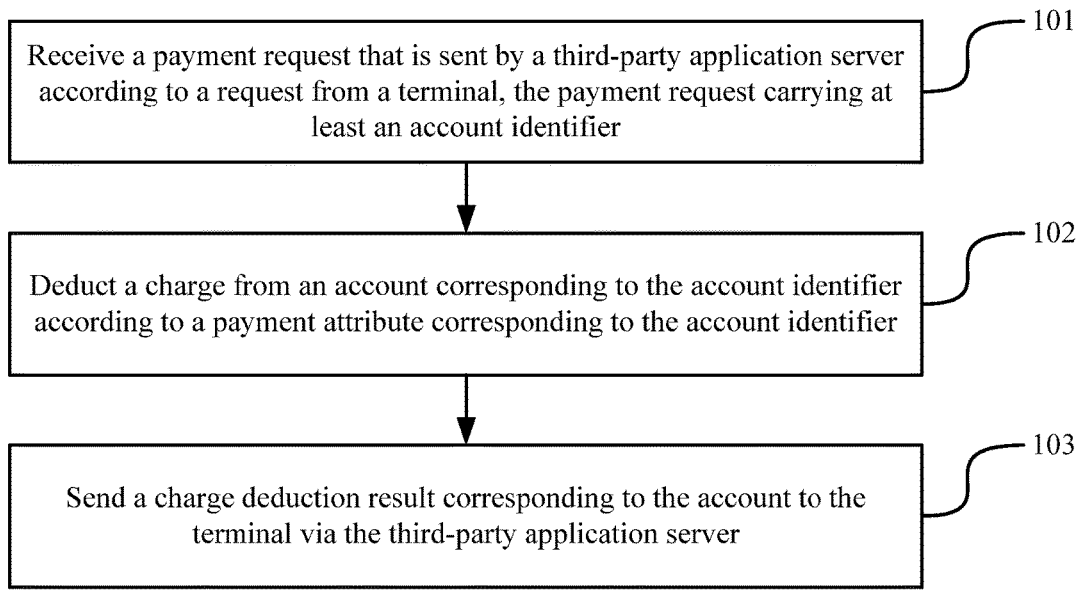
FIG. 1 is a flowchart of a method for processing a payment request for a virtual commodity on an open network platform according to an embodiment of the present disclosure.

An embodiment of the present disclosure provides a method for processing a payment request for a virtual commodity on an open network platform. As illustrated in FIG. 1, the method includes the following steps:

step 101: receiving a payment request that is sent by a third-party application server according to a request from a terminal, the payment request carrying at least an account identifier;

step 102: deducting a charge from an account corresponding to the account identifier according to a payment attribute corresponding to the account identifier; and step 103: sending a charge deduction result corresponding to the account to the terminal via the third-party application server.

According to this embodiment, a corresponding account is determined according to an account identifier carried in a payment request, a charge is deducted from the account according to a payment attribute of the account, and a charge deduction result is sent to a terminal via a third-party application server. With respect to different payment attributes of different terminals, different charge deduction methods may be employed, thereby preventing a traditional charge deduction method where payment and charge deduction are implemented only on a pop-up payment page. In this way, misoperations caused due to the pop-up page may be prevented, and usage rate of network and system resources may be improved.

An embodiment of the present disclosure provides a method for processing a payment request for a virtual commodity on an open network platform. Preferably, an executing subject of the method may be an open platform server. Herein, the virtual commodity may be content presented in a network application, for example, an electronic book, or may be a virtual item used in the network application, for example, a game item, or may be a software product involved in the network application.

The process of processing a payment request for a virtual commodity on an open network platform as illustrated in FIG. 1 is elaborated in detail with reference to specific implementation as follows:

Step 101: An open platform server receives a payment request that is sent by a third-party application server according to a request from a terminal, the payment request carrying at least an account identifier (for example, an account number). The payment request may further carry price information, where the price information may be the sum price of the commodities requested by a user, or may be identifiers, quantities, and unit prices of the commodities purchased by the user, which can be used by the open platform servers to calculate the sum price of the commodities. Related commodity information may be displayed on a page subsequently displayed to the terminal. Preferably, the payment request may further carry a transaction identifier, for example, a transaction track number. The third-party application server may be a server for application provided by a third party except of the open platform server and the terminal.

Specifically, during use of an application, if the user needs to purchase a virtual commodity therein, the user may click the Purchase button. In this case, the application generates a purchase request, where the request may carry such information as identifiers and quantity of commodities, and the account identifier of the account used by the user, and the information is sent to the third-party application server via the terminal. Upon receiving the purchase request, the third-party application server may record the account identifier carried in the purchase request, and generate a corresponding transaction identifier and price information. The third-party application server may generate a payment request corresponding to the purchase request, where the payment request may carry the account identifier and may further carry the transaction identifier and price information. Subsequently, the generated payment request is sent to the open platform server.

Step 102: The open platform server deducts a charge from an account corresponding to the account identifier according to a payment attribute corresponding to the account identifier. The payment attribute is used to indicate a payment mode currently used by an account. A plurality of payment attributes may be defined in advance, for example, a Do Not Disturb (DND) payment attribute to be described as follows. In the payment mode corresponding to the DND payment attribute, a charge may be deducted with no need of popping up a payment page.

In the method, DND payment attributes may be preset for various accounts on the open platform server. Specifically, an identifier bit recording that the account has the DND payment attribute or does not have the DND payment attribute may be set for each of the accounts. Nevertheless, preferably, the open platform server may record an account identifier of a account having the DND payment attribute, and may be provided with a DND payment account list, where the list records account identifiers of all accounts having the DND payment attribute. The DND payment attribute of the account may be uniformly set by the open platform server, and preferably, may be set by the user by sending a request via terminal. The specific process of setting the DND payment attribute is elaborated as follows.

Step 102 may specifically comprises: the open platform server deducts the charge from the account directly according to the payment request if the account corresponding to the account identifier has a DND payment attribute.

Specifically, upon receiving the payment request, the open platform server may acquire an account identifier carried therein, and query whether the acquired account identifier exists in the account identifiers of the accounts having the DND payment attribute that are recorded in the DND payment account list. If the acquired account identifier exists, the open platform server determines that the corresponding account has the DND payment attribute; otherwise, the open platform server determines that the corresponding account does not have the DND payment attribute.

If the account corresponding to an account identifier has the DND payment attribute, the open platform server may acquire the price information and the account identifier carried in the payment request. If the price information indicates the sum price of the commodities, the open platform server may deduct the sum from account balance of the corresponding account. If the price information indicates the identifiers, quantities, and unit prices of the commodities, the open platform server may calculate the sum price of the commodities according to the information, and deduct the sum from account balance of the corresponding account. The charge deduction herein typically refers to deduction in terms of virtual currency, for example, game currency, Q currency, and the like. To be specific, a transaction initiated by the user is a transaction of purchasing virtual commodities in the network application using virtual currency.

Step 103: The open platform server sends a charge deduction result corresponding to the account to the terminal via the third-party application server. The open platform server may also display the charge deduction result on a third-party application page of the terminal in a floating manner via the third-party application server. The third-party application page may be a display page on a client of the third-party application.

After step 102, the method may further include a step of instructing, by the open platform server, the third-party application server to deliver a commodity to the account corresponding to the account identifier.

Figure 2:
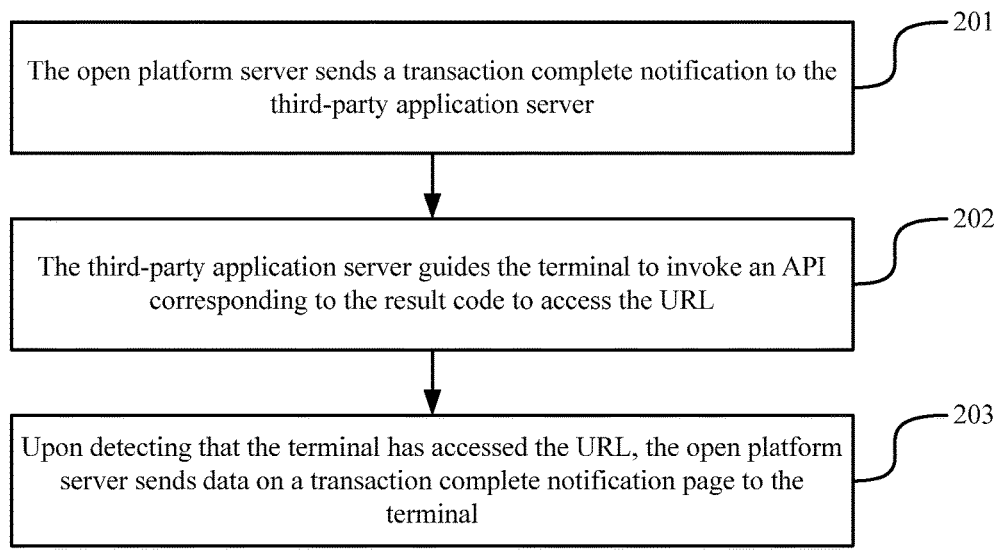
FIG. 2 is a flowchart of a method for processing a payment request for a virtual commodity on an open network platform according to an embodiment of the present disclosure.

Specifically, the open platform server may instruct, by sending a delivery notification to the third-party application server, the third-party application server to perform a delivery process. Upon completion of the delivery, the third-party application server notifies the open platform server that the delivery process is complete. Preferably, the process of instructing the third-party application server to perform a delivery process may be specifically as follows:

Firstly, the open platform server sends a delivery notification carrying a transaction identifier to the third-party application server. Subsequently, the open platform server performs corresponding processing with respect to the following two scenarios:

Scenario 1: Upon receiving a notification success notification carrying a transaction identifier sent by the third-party application server, the open platform server notifies, according to the process illustrated in FIG. 2, the terminal that the transaction is complete. The process may specifically include the following steps:

Step 201: The open platform server sends a transaction complete notification to the third-party application server. The transaction complete notification may carry a result code indicative of a successful DND payment and a URL of a transaction complete notification page.

The open platform server may pre-define a plurality of result codes with the third-party application server. Each of the result codes corresponds to an API. Each API may correspond to a plurality of result codes. These APIs may be preconfigured by the open platform server, and may be notified to the third-party application server. Further, a mapping relationship between result codes and APIs may be notified to the third-party application server. In this way, when the open platform server needs to display an interface-based notification on the terminal, the open platform server may send a corresponding notification to the third-party application server, where the notification may carry a corresponding result code such that the third-party application guides the terminal to invoke the corresponding API to display the interface-based notification.

Prior to sending the notification to the third-party application server, the open platform server may pre-generate related data on the transaction complete notification page that is to be displayed on the terminal, and store the generate data. The stored data may be accessed using the URL.

Step 202: The third-party application server guides the terminal to invoke an API corresponding to the result code to access the URL.

Specifically, the third-party application server may firstly acquire the API corresponding to the result code, and then sends the URL as a parameter of the API to the terminal, such that the terminal invokes the API to access the URL and perform corresponding window rendering. In addition, the third-party application server may also load the related API to the terminal when the terminal starts an application, and during step 202, send the corresponding result code or identifier of the API and the URL to the terminal, such that the terminal uses the URL as the parameter of the API to invoke the corresponding API to access the URL and perform the corresponding window rendering.

The API corresponding to the result code indicative of a successful DND payment may be preferably an API displayed at a floating layer. To be specific, after the API is invoked, the corresponding display window appears in a floating manner from a preset area, displays the corresponding content, and disappears a preset duration later. During the entire display process, user's operations on the application are not affected.

Step 203: Upon detecting that the terminal has accessed the URL, the open platform server sends data on a transaction complete notification page to the terminal.

The data of the transaction complete notification page is stored at the address corresponding to the URL. The data may include notification text indicative of transaction completion and sum price of the commodities, and may further include names, quantities, and unit prices of the commodities. When the terminal accesses the URL, the open platform server sends the data to the terminal for the terminal to display the same.

Figure 3:
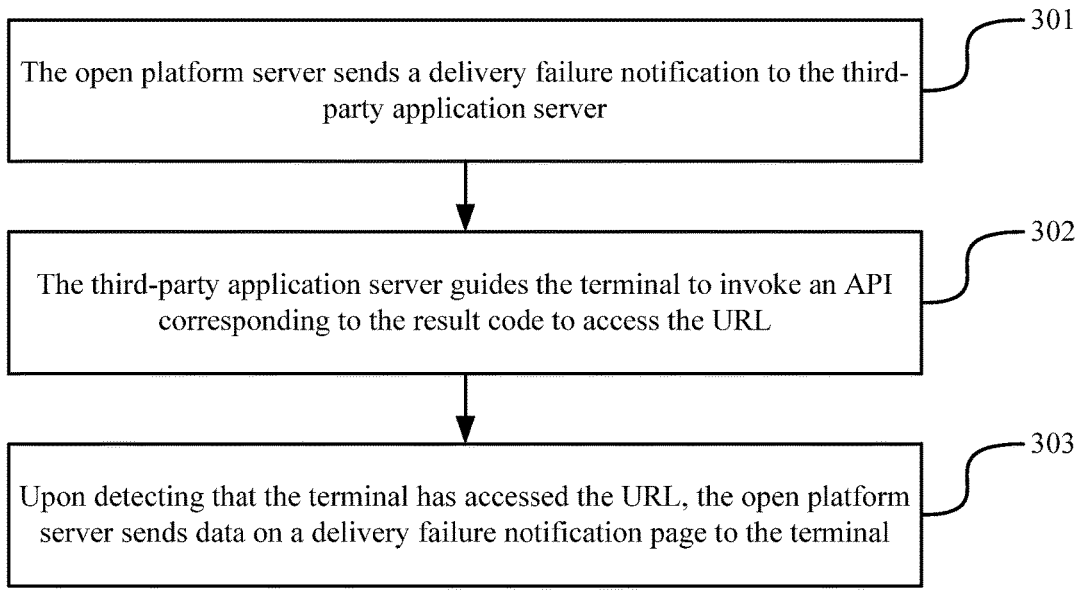
FIG. 3 is a flowchart of a method for processing a payment request for a virtual commodity on an open network platform according to an embodiment of the present disclosure.

Scenario 2: Upon detecting that the third-party application server fails in the delivery (the open platform server may preset a response duration; if a delivery success notification has not been received from the third-party application server within the preset response duration after sending a delivery notification, the open platform server determines that the delivery fails; and if receiving a delivery failure notification from the third-party application server, the open platform server also determines that the delivery fails), the open platform server refunds the deducted charge to the account corresponding to the account identifier, and sends a delivery failure notification to the third-party application server according to the process illustrated in FIG. 3. The process may specifically include the following steps:

Step 301: The open platform server sends a delivery failure notification to the third-party application server. The delivery failure notification may carry a result code indicative of a failed delivery and a URL of a delivery failure notification page.

Step 302: The third-party application server guides the terminal to invoke an API corresponding to the result code to access the URL.

Step 303: Upon detecting that the terminal has accessed the URL, the open platform server sends data on a delivery failure notification page to the terminal.

Steps 301-303 are similar to steps 201-203, with difference only in corresponding page data and parameter. Therefore, the specific process may be referenced to steps 201-203, which is not described herein any further.

In addition, the API corresponding to the result code indicative of a delivery failure may also be an API displayed at a floating layer. Nevertheless, for ease of prompt to the user, an API displayed at an upper layer may also be used, where the corresponding display window may be displayed at the upper layer on an application interface, and the application interface is locked at the lower part. In this way, the user may only operate on the window displayed at the upper layer, and may operative on the original application interface after the window displayed at the upper layer is closed.

Figure 4:
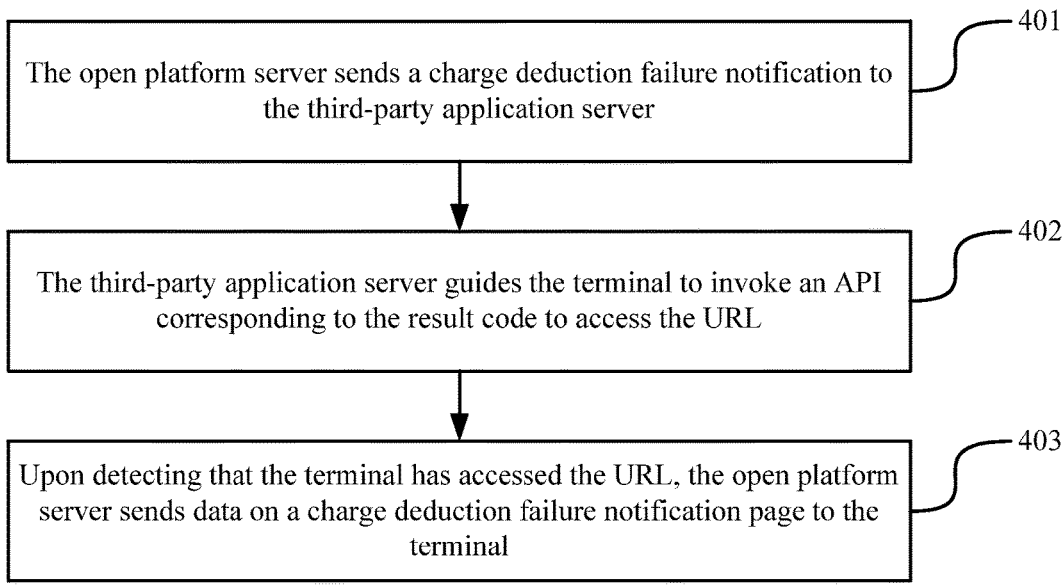
FIG. 4 is a flowchart of a method for processing a payment request for a virtual commodity on an open network platform according to an embodiment of the present disclosure.

In step 102, during the charge deduction from the account corresponding to the account identifier carried in the payment request, if the charge deduction fails (a charge deduction failure may be caused due to insufficient balance in the account), the charge deduction failure may be notified to the terminal according to the process illustrated in FIG. 4. The process may specifically include the following steps:

Step 401: The open platform server sends a charge deduction failure notification to the third-party application server. The charge deduction failure notification may carry a result code indicative of a failed charge deduction and a URL of a charge deduction failure notification page.

Step 402: The third-party application server guides the terminal to invoke an API corresponding to the result code to access the URL.

Step 403: Upon detecting that the terminal has accessed the URL, the open platform server sends data on a charge deduction failure notification page to the terminal.

Steps 401-403 are similar to steps 201-203, with difference only in corresponding page data and parameter. Therefore, the specific process may be referenced to steps 201-203, which is not described herein any further.

In addition, the API corresponding to the result code indicative of a charge deduction failure may also be an API displayed at a floating layer. Nevertheless, for ease of prompt to the user, an API displayed at an upper layer may also be used.

In this embodiment, in cases where the account corresponding to an account identifier carried in the payment request has the DND payment attribute, the process may be performed according to step 102; in cases where the account corresponding to an account identifier carried in the payment request does not have the DND payment attribute, the process is performed according to a preset processing manner.

Figure 5:
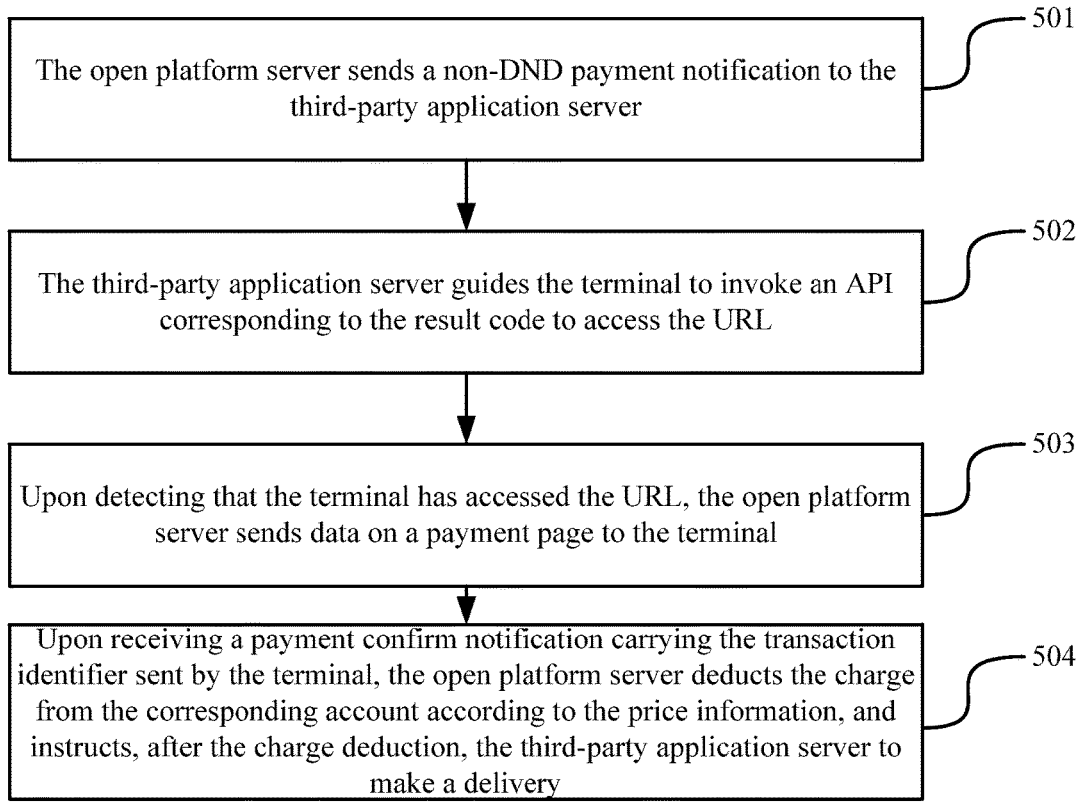
FIG. 5 is a flowchart of a method for processing a payment request for a virtual commodity on an open network platform according to an embodiment of the present disclosure.

The processing manner may be a default one. In addition, the process may be performed according to the manner illustrated in FIG. 5, including the following steps:

Step 501: The open platform server sends a non-DND payment notification to the third-party application server. The non-DND payment notification carries a transaction identifier, a result code indicative of a non-DND payment, and a URL of a payment page.

Step 502: The third-party application server guides the terminal to invoke an API corresponding to the result code to access the URL.

Step 503: Upon detecting that the terminal has accessed the URL, the open platform server sends data on a payment page to the terminal.

Steps 501-503 are similar to steps 201-203, with difference only in corresponding page data and parameter. Therefore, the specific process may be referenced to steps 201-203, which is not described herein any further.

It should be noted that the API corresponding to the result code indicative of a non-DND payment may be preferably an API displayed at an upper layer.

Step 504: Upon receiving a payment confirm notification carrying the transaction identifier sent by the terminal, the open platform server deducts the charge from the corresponding account according to the price information, and instructs, after the charge deduction, the third-party application server to make a delivery.

The open platform server instructs the third-party application server to perform a delivery process and a process with respect to the charge deduction failure. The details may be referenced to the above specific process, which is not described herein any further.

Based on the method for processing a payment request for a virtual commodity on an open network platform, an embodiment of the present disclosure further provides a method for setting a DND payment attribute for an account, where the open platform server pre-records the account identifier of an account having the DND payment attribute.

The account identifier may be recorded in a DND payment account list. The method may include the following steps:

First, the open platform server receives a DND payment attribute setting request sent by the terminal or the third-party application server. The DND payment attribute setting request carries an account identifier and corresponding operation information. The operation information may indicate enabling a DND payment or canceling a DND payment.

Before setting a DND payment attribute, the user may send a DND payment attribute setting request to the open platform server via the terminal, or may send a DND payment attribute setting request to the third-party application server, whereupon the third-party application server forwards the request to the open platform server.

Preferably, during steps 201-203, the open platform server may set an option for canceling the DND payment on the transaction complete notification page, and the user may choose whether to cancel the DND payment. If the user chooses to cancel the DND payment, the terminal sends operation information indicating canceling the DND payment to the open platform server as the DND payment attribute setting request.

During steps 501-504, the open platform server may set an option for enabling the DND payment on the payment page, and the user may choose whether to enable the DND payment. If the user chooses to enable the DND payment, the terminal sends operation information indicating enabling the DND payment to the open platform server as the DND payment attribute setting request.

Subsequently, if the operation information indicates enabling the DND payment, the open platform server records the account identifier as the account identifier of the account having the DND payment attribute; and if the operation indicates canceling the DND payment, the open platform server delete the account identifier from the account identifiers of the accounts having the DND payment attribute. Upon completion of the operation, a setting success notification may be sent to the terminal.

According to this embodiment, a corresponding account is determined according to an account identifier carried in a payment request, a charge is deducted from the account according to a payment attribute of the account, and a charge deduction result is sent to a terminal via a third-party application server. With respect to different payment attributes of different terminals, different charge deduction methods may be employed, thereby preventing a traditional charge deduction method where payment and charge deduction are implemented only on a pop-up payment page. In this way, misoperations caused due to the pop-up page may be prevented, and usage rate of network and system resources may be improved.

Figure 6:
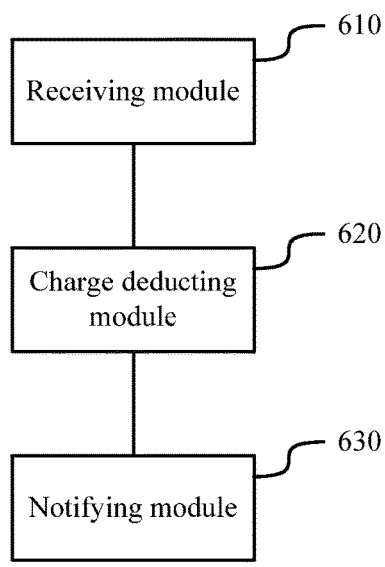
FIG. 6 is a schematic structural diagram of an apparatus for processing a payment request for a virtual commodity on an open network platform according to an embodiment of the present disclosure.

Based on the same technical concept, an embodiment of the present disclosure provides an apparatus for processing a payment request for a virtual commodity on an open network platform. As illustrated in FIG. 6, the apparatus includes:
 a receiving module 610, configured to receive a payment request that is sent by a third-party application server according to a request from a terminal, the payment request carrying at least an account identifier;
 a charge deducting module 620, configured to deduct a charge from an account corresponding to the account identifier according to a payment attribute corresponding to the account identifier; and
 a notifying module 630, configured to send a charge deduction result corresponding to the account to the terminal via the third-party application server.

Preferably, the notifying module 630 is further configured to display the charge deduction result on a third-party application page of the terminal at a floating layer via the third-party application server.

Preferably, the charge deducting module 620 is configured to:
 deduct the charge from the account according to the payment request if the account corresponding to the account identifier has a DND payment attribute.

Preferably, the notifying module 630 is further configured to:
 instruct the third-party application server to delivery the commodity to the account corresponding to the account identifier.

Preferably, the payment request further carries a transaction identifier.

The notifying module 630 is configured to:
 send a delivery notification carrying the transaction identifier to the third-party application server;
 upon receiving a delivery success notification carrying the transaction identifier sent by the third-party application server, send a transaction complete notification to the third-party application server, the transaction complete notification carrying a result code indicative of a successful DND payment and a URL of a transaction complete notification page, such that the third-party application server guides the terminal to invoke an API corresponding to the result code to access the URL; and upon detecting that the terminal has accessed the URL, send data on the transaction complete notification page to the terminal;
 upon detecting that the third-party application server fails in the delivery, refund the deducted charge to the account corresponding to the account identifier, and send a delivery failure notification to the third-party application server, the delivery failure notification carrying a result code indicative of a failed delivery and a URL of a delivery failure notification page, such that the third-party application server guides the terminal to invoke an API corresponding to the result code to access the URL; and upon detecting that the terminal has accessed the URL, send data on the delivery failure notification page to the terminal.

Preferably, the API corresponding to the result code indicative of the successful DND payment, and/or the API corresponding to the result code indicative of the failed delivery is an API displayed at a floating layer.

Preferably, the notifying module 630 is further configured to:
 send a charge deduction failure notification to the third-party application server, the charge deduction failure notification carrying a result code indicative of a failed charge deduction and a URL of a charge deduction failure notification page, such that the third-party application server guides the terminal to invoke an API corresponding to the result code to access the URL; and upon detecting that the terminal has accessed the URL, send data on the charge deduction failure notification page to the terminal.

Preferably, the apparatus further includes a recording module, configured to:
 pre-record the account identifier of the account having the DND payment attribute.

Preferably, the recording module is further configured to:
receive a DND payment attribute setting request sent by the terminal or the third-party application server, the DND payment attribute setting request carrying the account identifier and corresponding operation information;

if the operation information indicates enabling a DND payment, record the account identifier as the account identifier of the account having the DND payment attribute;

if the operation information indicates canceling a DND payment, delete the account identifier from the recorded account identifiers of the accounts having the DND payment attribute.

According to this embodiment, a corresponding account is determined according to an account identifier carried in a payment request, a charge is deducted from the account according to a payment attribute of the account, and a charge deduction result is sent to a terminal via a third-party application server. With respect to different payment attributes of different terminals, different charge deduction methods may be employed, thereby preventing a traditional charge deduction method where payment and charge deduction are implemented only on a pop-up payment page. In this way, misoperations caused due to the pop-up page may be prevented, and usage rate of network and system resources may be improved.

Figure 7:
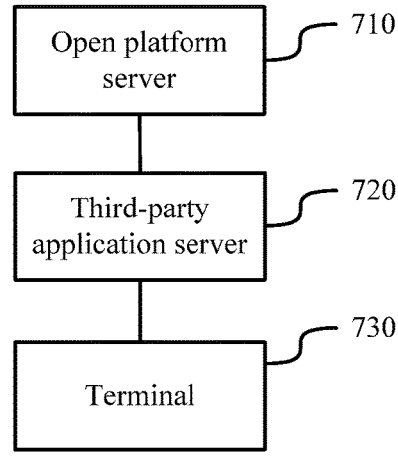
FIG. 7 is a schematic structural diagram of a system for processing a payment request for a virtual commodity on an open platform server according to an embodiment of the present disclosure.

Based on the same technical concept, an embodiment of the present disclosure provides a system for processing a payment request for a virtual commodity on an open network platform. As illustrated in FIG. 7, the system includes an open platform server 710, a third-party application server 720, and at least one terminal 730.

The third-party application server 720 is configured to: send a payment request to the open platform server 710 according to a request of the terminal 730, the payment request carrying at least an account identifier; and upon receiving a charge deduction result sent by the open platform server 710, send the deduction result to the terminal 730.

The open platform server 710 is configured to: upon receiving the payment request, deduct a charge from an account corresponding to the account identifier according to a payment attribute corresponding to the account identifier; and send a deduction result corresponding to the account to the third-party application server 720.

According to this embodiment, a corresponding account is determined according to an account identifier carried in a payment request, a charge is deducted from the account according to a payment attribute of the account, and a charge deduction result is sent to a terminal via a third-party application server. With respect to different payment attributes of different terminals, different charge deduction methods may be employed, thereby preventing a traditional charge deduction method where payment and charge deduction are implemented only on a pop-up payment page. In this way, misoperations caused due to the pop-up page may be prevented, and usage rate of network and system resources may be improved.

Figure 8:
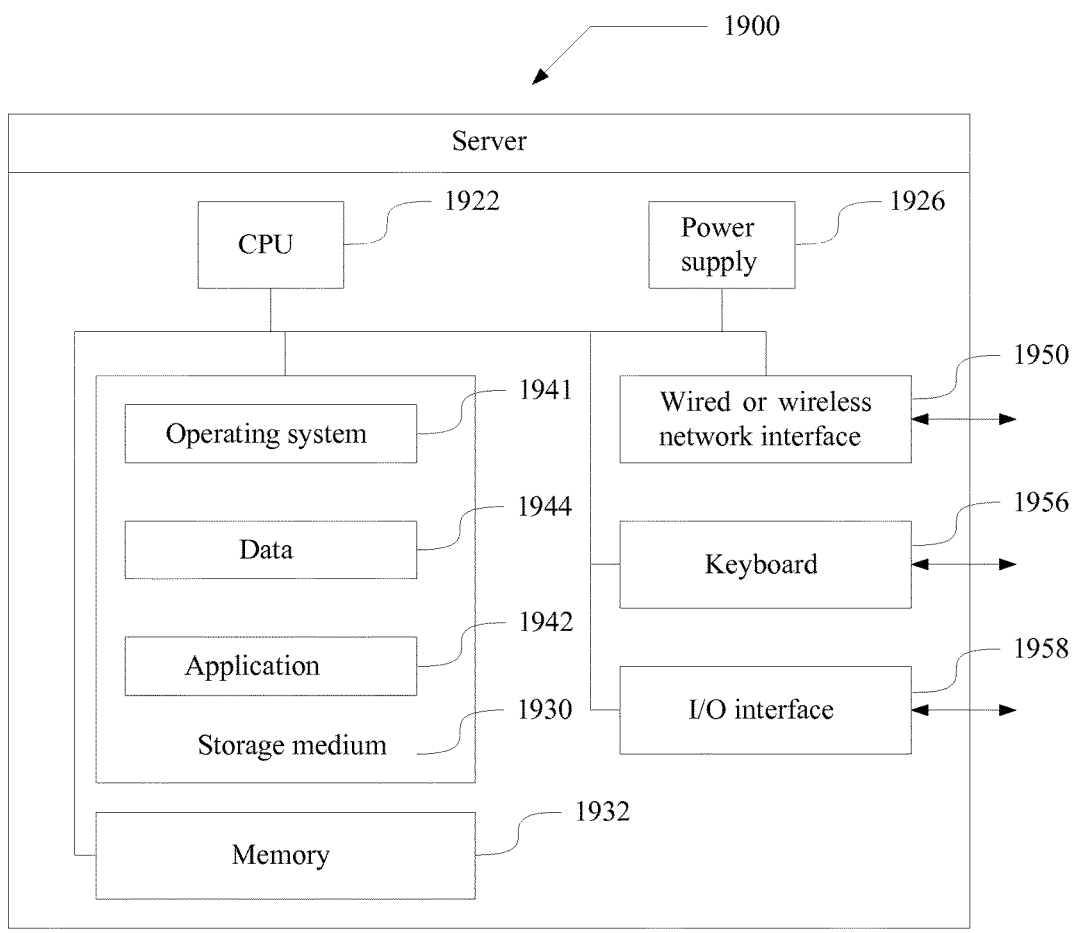
FIG. 8 is a schematic structural diagram of an open platform server according to an embodiment of the present disclosure.

FIG. 8 is a schematic structural diagram of a server according to an embodiment of the present disclosure (the server may serve as the open platform server). The server 1900 may function differently depending on configuration or performance, and may include at least one central processing unit (CPU) 1922 (for example, at least one processor), a memory 1932, at least one storage medium 1930 (for example, at least one mass storage device) for storing an application procedure 1942 or data 1944. The memory 1932 and the non-transitory storage medium 1930 may be used for non-transitory storage or permanent storage. Programs stored in the storage medium 1930 may include at least one module (now shown in the drawing), where each module may include a series of operation instructions to be executed on the server. Further, the CPU 1922 may be set as communicating with the storage medium 1930, and executing the operation instructions included in the storage medium 1930 on the server 1900.

The server 1900 may further include at least one power supply 1926, at least one wired or wireless network interface 1950, at least one input/output interface 1958, at least one keyboard 1956, and/or at least one operating system 1941, for example, Windows Server™, Mac OS X™, Unix™, Linux™, FreeBSD™, and the like.

The server 1900 may include a memory and at least one program, where the at least one program is stored in the memory, and is configured to be executed by at least one processor. The at least one program includes instructions for performing the following operations:

receiving a payment request that is sent by a third-party application server according to a request from a terminal, the payment request carrying at least an account identifier;

deducting a charge from an account corresponding to the account identifier according to a payment attribute corresponding to the account identifier; and sending a charge deduction result corresponding to the account to the terminal via the third-party application server.

Preferably, the at least one program further includes an instruction for performing the following operation:

displaying the charge deduction result on a third-party application page of the terminal at a floating layer via the third-party application server.

Preferably, the deducting a charge from an account corresponding to the account identifier according to a payment attribute corresponding to the account identifier includes:

deducting the charge from the account according to the payment request if the account corresponding to the account identifier has a DND payment attribute.

Preferably, the at least one program further includes an instruction for performing the following operation:

instructing the third-party application server to delivery the commodity to the account corresponding to the account identifier.

Preferably, the payment request further carries a transaction identifier.

the instructing the third-party application server to delivery the commodity to the account corresponding to the account identifier includes:

sending a delivery notification carrying the transaction identifier to the third-party application server;

upon receiving a delivery success notification carrying the transaction identifier sent by the third-party application server, sending a transaction complete notification to the third-party application server, the transaction complete notification carrying a result code indicative of a successful DND payment and a URL of a transaction complete notification page, such that the third-party application server guides the terminal to invoke an API corresponding to the result code to access the URL; and upon detecting that the terminal has accessed the URL, sending data on the transaction complete notification page to the terminal;

upon detecting that the third-party application server fails in the delivery, refunding the deducted charge to the account corresponding to the account identifier, and sending a delivery failure notification to the third-party application server, the delivery failure notification carrying a result code indicative of a failed delivery and a URL of a delivery failure notification page, such that the third-party application server guides the terminal to invoke an API corresponding to the result code to access the URL; and upon detecting that the terminal has accessed the URL, sending data on the delivery failure notification page to the terminal.

Preferably, the API corresponding to the result code indicative of the successful DND payment, and/or the API corresponding to the result code indicative of the failed delivery is an API displayed at a floating layer.

Preferably, the at least one program further includes instructions for performing the following operations:

sending a charge deduction failure notification to the third-party application server, the charge deduction failure notification carrying a result code indicative of a failed charge deduction and a URL of a charge deduction failure notification page, such that the third-party application server guides the terminal to invoke an API corresponding to the result code to access the URL; and upon detecting that the terminal has accessed the URL, sending data on the charge deduction failure notification page to the terminal.

Preferably, the at least one program further includes an instruction for performing the following operation:

pre-recording the account identifier of the account having the DND payment attribute.

Preferably, the at least one program further includes instructions for performing the following operations:

receiving a DND payment attribute setting request sent by the terminal or the third-party application server, the DND payment attribute setting request carrying the account identifier and corresponding operation information;

if the operation information indicates enabling a DND payment, recording the account identifier as the account identifier of the account having the DND payment attribute;

if the operation information indicates canceling a DND payment, deleting the account identifier from the recorded account identifiers of the accounts having the DND payment attribute.

According to this embodiment, a corresponding account is determined according to an account identifier carried in a payment request, a charge is deducted from the account according to a payment attribute of the account, and a charge deduction result is sent to a terminal via a third-party application server. With respect to different payment attributes of different terminals, different charge deduction methods may be employed, thereby preventing a traditional charge deduction method where payment and charge deduction are implemented only on a pop-up payment page. In this way, misoperations caused due to the pop-up page may be prevented, and usage rate of network and system resources may be improved.

It should be noted that, during processing of a payment request, the apparatus for processing a payment request for a virtual commodity on an open network platform according to the embodiment of the present disclosure is described by only using division of the above functional modules as an example. In practice, the functions may be assigned to different functional modules for implementation as required. To be specific, the internal structure of the apparatus is divided into different functional modules to implement all or part of the above-described functions. Furthermore, the apparatus for processing a payment request for a virtual commodity on an open network platform is based on the same inventive concept as the method for processing a payment request for a virtual commodity on an open network platform according to the embodiments of the present disclosure. The specific implementation is elaborated in the method embodiments, which is not described herein any further.

The sequence numbers of the preceding embodiments of the present disclosure are only for ease of description, but do not denote the preference of the embodiments.

Persons of ordinary skill in the art should understand that all or part of steps of the preceding methods may be implemented by hardware or hardware following instructions of programs. The programs may be stored in a non-transitory computer-readable storage medium, and may be executed by at least one processor. The storage medium may be a read only memory, a magnetic disk, or a compact disc-read only memory.

Described above are merely preferred embodiments of the present disclosure, but are not intended to limit the present disclosure. Any modification, equivalent replacement, or improvement made without departing from the spirit and principle of the present disclosure should fall within the protection scope of the present disclosure.

What is claimed is:

1. A method for processing a payment request for a virtual commodity on an open network platform, comprising:

receiving, by the open network platform including a processor and a memory, a payment request that is sent by a third-party application server according to a request from a terminal, the payment request carrying at least an account identifier;

determining, by the processor of the open network platform, whether the account identifier has a Do Not Disturb (DND) payment attribute by querying an account list based on the account identifier, wherein the account list is stored in the memory and includes a plurality of account identifiers of accounts having the DND payment attribute;

in response to determining that the account identifier has the DND payment attribute, directly deducting, by the processor of the open network platform, a charge from an account corresponding to the account identifier without returning a payment page to be displayed at the terminal that requests a payment confirmation;

sending, by the processor of the open network platform, a charge deduction result corresponding to the account to the terminal via the third-party application server;

invoking, on the terminal, an application programming interface (API) associated with the charge deduction result to render a first window of the charge deduction result; and displaying, on a screen of the terminal, the first window in a floating layer on a user interface of a third-party application of the terminal in response to determining that the account identifier has the DND payment attribute such that user operations on the third-party application is not affected during a process of displaying the first window.

2. The method according to claim 1, further comprising: instructing the third-party application server to deliver the virtual commodity to the account corresponding to the account identifier.

3. The method according to claim 2, wherein the payment request further carries a transaction identifier; and said instructing the third-party application server to deliver the virtual commodity to the account corresponding to the account identifier comprises:

sending a delivery notification carrying the transaction identifier to the third-party application server;

upon receiving a delivery success notification carrying the transaction identifier sent by the third-party application server, sending a transaction complete notification to the third-party application server, the transaction complete notification carrying a first result code indicative of a successful Do Not Disturb (DND) payment and a first uniform resource locator (URL) of a transaction complete notification page, such that the third-party application server guides the terminal to invoke a first API corresponding to the first result code to access the first URL; and upon detecting that the terminal has accessed the first URL, sending first data on the transaction complete notification page to the terminal;

upon detecting that the third-party application server fails in the delivery, refunding the deducted charge to the account corresponding to the account identifier, and sending a delivery failure notification to the third-party application server, the delivery failure notification carrying a second result code indicative of a failed delivery and a second URL of a delivery failure notification page, such that the third-party application server guides the terminal to invoke a second API corresponding to the second result code to access the second URL; and upon detecting that the terminal has accessed the second URL, sending second data on the delivery failure notification page to the terminal.

4. The method according to claim 3, wherein the first API corresponding to the first result code indicative of the successful DND payment is displayed at the floating layer, and the second API corresponding to the second result code indicative of the failed delivery is displayed at the floating layer.

5. The method according to claim 1, further comprising:
sending a charge deduction failure notification to the third-party application server, the charge deduction failure notification carrying a third result code indicative of a failed charge deduction and a third URL of a charge deduction failure notification page, such that the third-party application server guides the terminal to invoke a third API corresponding to the third result code to access the third URL; and upon detecting that the terminal has accessed the third URL, sending third data on the charge deduction failure notification page to the terminal.

6. The method according to claim 1, further comprising:
pre-recording the account identifier of the account having the DND payment attribute.

7. The method according to claim 6, further comprising:
receiving a DND payment attribute setting request sent by the terminal or the third-party application server, the DND payment attribute setting request carrying the account identifier and corresponding operation information;
if the operation information indicates enabling a DND payment, recording the account identifier as the account identifier of the account having the DND payment attribute; or
if the operation information indicates canceling a DND payment, deleting the account identifier from the recorded account identifiers of the accounts having the DND payment attribute.

8. The method according to claim 1, wherein displaying the first window comprises:

displaying the first window in a preset area on the third-party application user interface that does not affect user operation on the third-party application.

9. The method according to claim 1, wherein invoking the API associated with the charge deduction result comprises:
predefining a plurality of result codes indicating a plurality of payment request processing results with the third-party application server;
preconfiguring mapping relationships between the plurality of result codes and APIs, each result code corresponds to one of the APIs; and
when the open network platform needs to display an interface-based notification on the terminal, sending the interface-based notification carrying to a corresponding result code the third-party application server such that the third-party application guides the terminal to invoke the corresponding API to display the interface-based notification.

10. An apparatus for processing a payment request for a virtual commodity on an open network platform, comprising:
a memory; and
a processor coupled to the memory and applied in the open network platform; wherein the processor is configured to:
receive, by the processor of the open network platform, a payment request that is sent by a third-party application server according to a request from a terminal, the payment request carrying at least an account identifier;
determine, by the processor of the open network platform, whether the account identifier has a Do Not Disturb (DND) payment attribute by querying an account list based on the account identifier, wherein the account list is stored in the memory and includes a plurality of account identifiers of accounts having the DND payment attribute;
in response to determining that the account identifier has the DND payment attribute, directly deduct, by the processor of the open network platform, a charge from an account corresponding to the account identifier without returning a payment page to be displayed at the terminal that requests a payment confirmation;
send, by the processor of the open network platform, a charge deduction result corresponding to the account to the terminal via the third-party application server;
invoke, at the terminal, an application programming interface (API) associated with the charge deduction result to render a first display window of the charge deduction result; and
display, on a screen of the terminal, the first display window in a floating layer on a user interface of a third-party application of the terminal in response to determining that the account identifier has the DND payment attribute such that user operations on the third-party application is not affected during a process of displaying the first window.

11. The apparatus according to claim 10, wherein the processor is further configured to:
instruct the third-party application server to deliver the virtual commodity to the account corresponding to the account identifier.

12. The apparatus according to claim 11, wherein the payment request further carries a transaction identifier; and the processor is configured to:
send a delivery notification carrying the transaction identifier to the third-party application server;

upon receiving a delivery success notification carrying the transaction identifier sent by the third-party application server, send a transaction complete notification to the third-party application server, the transaction complete notification carrying a first result code indicative of a successful Do Not Disturb (DND) payment and a first uniform resource locator (URL) of a transaction complete notification page, such that the third-party application server guides the terminal to invoke a first API corresponding to the first result code to access the first URL; and upon detecting that the terminal has accessed the first URL, send first data on the transaction complete notification page to the terminal;

upon detecting that the third-party application server fails in the delivery, refund the deducted charge to the account corresponding to the account identifier, and send a delivery failure notification to the third-party application server, the delivery failure notification carrying a second result code indicative of a failed delivery and a second URL of a delivery failure notification page, such that the third-party application server guides the terminal to invoke a second API corresponding to the second result code to access the second URL; and upon detecting that the terminal has accessed the second URL, send second data on the delivery failure notification page to the terminal.

13. The apparatus according to claim 12, wherein the first API corresponding to the first result code indicative of the successful DND payment is displayed at the floating layer, and the second API corresponding to the second result code indicative of the failed delivery is displayed at the floating layer.

14. The apparatus according to claim 10, wherein the processor is further configured to:
send a charge deduction failure notification to the third-party application server, the charge deduction failure notification carrying a third result code indicative of a failed charge deduction and a third URL of a charge deduction failure notification page, such that the third-party application server guides the terminal to invoke a third API corresponding to the third result code to access the third URL; and upon detecting that the terminal has accessed the third URL, send third data on the charge deduction failure notification page to the terminal.

15. The apparatus according to claim 10, wherein the processor is further configured to:
pre-record the account identifier of the account having the DND payment attribute.

16. The apparatus according to claim 15, wherein the processor is further configured to:
receive a DND payment attribute setting request sent by the terminal or the third-party application server, the DND payment attribute setting request carrying the account identifier and corresponding operation information;
if the operation information indicates enabling a DND payment, record the account identifier as the account identifier of the account having the DND payment attribute;
if the operation information indicates canceling a DND payment, delete the account identifier from the recorded account identifiers of the accounts having the DND payment attribute.

17. The apparatus according to claim 10, wherein the processor is further configured to:

in response to determining that the account identifier does not have the DND payment attribute, send a payment notification carrying a transaction identifier, a result code indicative of a non-DND payment, and a URL of the payment page;
receive a payment confirmation notification carrying the transaction identifier from the terminal based on user input on the payment page displayed in the third-party application user interface; and
upon receiving the payment confirmation notification, deduct the charge from the account corresponding to the account identifier.

18. The apparatus according to claim 17, wherein the processor is further configured to:
if the account identifier has the non-DND payment attribute, display the first window in an upper layer on the third-party application user interface of the terminal; and lock the third-party application user interface at a lower layer, wherein only operation on the first window displayed on the upper layer is allowed until the first window is closed.

19. The apparatus according to claim 17, wherein the processor is further configured to:
set an option for enabling a DND payment on the payment page displayed in the third-party application user interface;
receive an operation information indicating the option for enabling the DND payment is selected from the terminal; and
add the account identifier to the account list upon receiving the operation information.

20. A system for processing a payment request for a virtual commodity on an open network platform, comprising an open platform server, a third-party application server, and at least one terminal, wherein:
the third-party application server is configured to: send a payment request to the open platform server according to a request of the terminal, the payment request carrying at least an account identifier; and upon receiving a charge deduction result sent by the open platform server, send the charge deduction result to the terminal; and
the open platform server is configured to:
upon receiving the payment request, determine, by a processor of the open network platform, whether the account identifier has a Do Not Disturb (DND) payment attribute by querying an account list based on the account identifier, wherein the account list is stored in a memory of the open platform server and includes a plurality of account identifiers of accounts having the DND payment attribute;
in response to determining that the account identifier has the DND payment attribute, directly deduct, by the processor of the open network platform, a charge from an account corresponding to the account identifier without returning a payment page to be displayed at the terminal that requests a payment confirmation; and
send, by the processor of the open network platform, the charge deduction result corresponding to the account to the third-party application server;
the third-party application server is further configured to:
invoke, at the terminal, an application programming interface (API) associated with the charge deduction result to render a first display window of the charge deduction result; and
the terminal is configured to display, on a screen of the terminal, the first display window in a floating layer on a user interface of a third-party application of the terminal in response to determining that the account identifier has the DND payment attribute such that user operations on the third-party application is not affected during a process of displaying the first window.

* * * * *